No. 852,677. PATENTED MAY 7, 1907.
L. REASER.
LID FOR COOKING VESSELS.
APPLICATION FILED MAR. 28, 1906.

WITNESSES:
J. O'Kelly,
Geo. R. Miller,

Lewis Reaser,
INVENTOR

BY
ATTORNEY.

UNITED STATES PATENT OFFICE.

LEWIS REASER, OF READING, PENNSYLVANIA.

LID FOR COOKING VESSELS.

No. 852,677.      Specification of Letters Patent.      Patented May 7, 1907.

Application filed March 28, 1906. Serial No. 308,391.

*To all whom it may concern:*

Be it known that I, LEWIS REASER, a citizen of the United States, residing at Reading, in the county of Berks and State of Pennsylvania, have invented certain new and useful Improvements in Lids for Cooking Vessels, of which the following is a specification.

This invention relates to improvements in lids for cooking vessels and while it is intended more particularly for use on a wash-boiler, it may be applied with equal facility to boilers of different shapes and for different purposes.

The object of the invention is to provide a lid or cover in which the steam or foam caused by boiling the contents of the vessel are allowed to escape through perforations in the cover and to be retained in a reservoir formed thereon, thus preventing the so called "boiling over" of the contents, in which case the water runs down the sides of the boiler and defaces both the boiler and the stove.

My invention is more fully described in the following specifications and clearly illustrated in the accompanying drawing, in which:—

Figure 1:
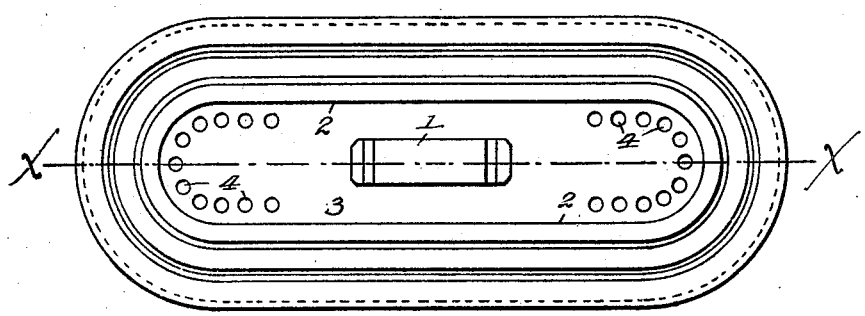
Figure 2:
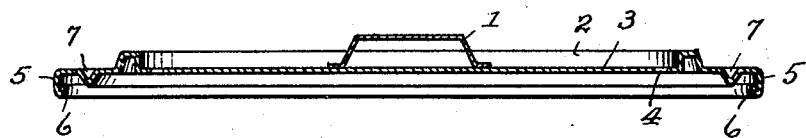

Figure 1, is a plan view of my lid and Fig. 2, is a central sectional view on line X—X of Fig. 1.

The cover may be made of any suitable metal and its shape is immaterial though I have shown it oblong with rounded ends. It is provided with the usual handle 1 and is formed with an upright wall 2 of the same outline as the outer edge of the lid. This wall forms a reservoir and the body of the cover 3 is formed with a series of perforations 4 near either end of this reservoir just inside of said wall.

The outer edge 5 of the body of the cover 3 is bent down at right angles to said body portion, and its extremity is bent inwardly upon itself, forming a bead 6 which gives a smooth finish to the edge of the lid.

Midway between the wall of the reservoir and the outer edge of the lid I form a depression 7, approximately V-shaped and extending all around the lid. The purpose of this depression is to catch any liquid which might possibly pass over the top of the wall 2, on the cover, and to prevent the beads of condensed steam which form on the inside of the lid from running out to the edge and down the sides of the boiler. In this construction this liquid will reach only the depending edge of the depression 7 from which it will drop into the vessel.

It will be seen that with my device the contents of the vessel are kept entirely within it. The reservoir serves to catch any liquid or foam that may escape through the perforations and will, if in the form of foam, hold it there until it returns to liquid form when it will pass through said perforations again into the vessel.

The perforations are placed so that the handle may be grasped without injury from the escaping steam.

In a circular lid the perforations may be continued all around the outer edge of the reservoir if desired and the cover may be made slightly higher at the center so as to insure any liquid that may appear in the reservoir finding its way to the perforations.

It is understood that the outline or contour of the lid is immaterial as it may be circular, oblong, square or any other form, without departing from the spirit of the invention.

Having thus fully described my invention, what I claim and desire to secure by Letters Patent is:—

A lid or cover for cooking vessels comprising a flat body having an upstanding wall thereon forming a reservoir of uniform depth, a handle secured upon the bottom of said reservoir and extending above the wall, said reservoir bottom having perforations, an annular, angular rib upon the lower face of the cover and adjacent the periphery thereof, said rib constituting a moisture retainer, there being an annular groove or channel in the upper face of the cover and above the rib, said groove being disposed outside the wall, and a flange depending from the periphery of the cover.

In testimony whereof I affix my signature in presence of two witnesses.

LEWIS REASER.

Witnesses:
     ED. A. KELLY,
     J. O'R. KELLY.